United States Patent Office 3,444,803
Patented May 20, 1969

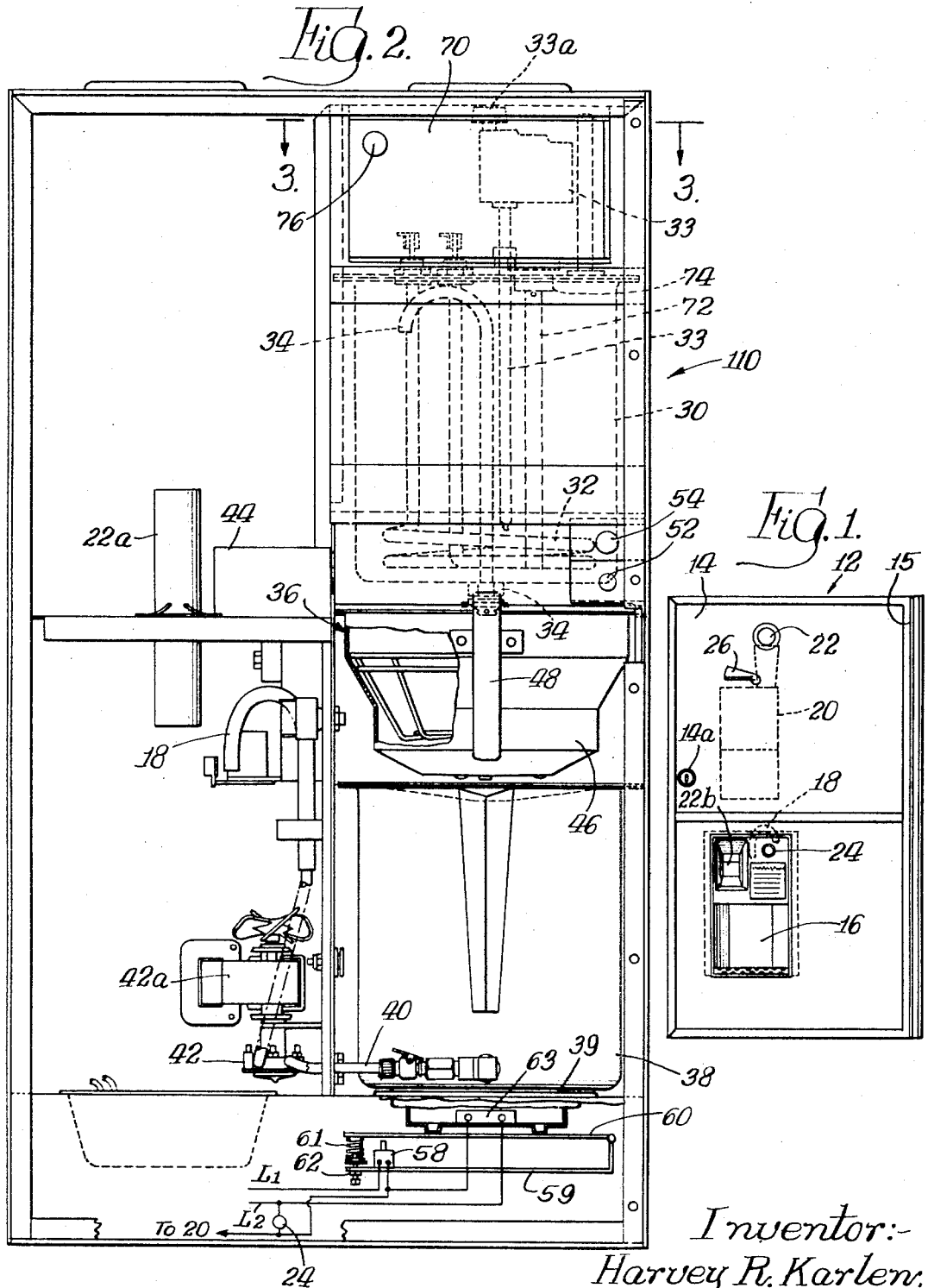

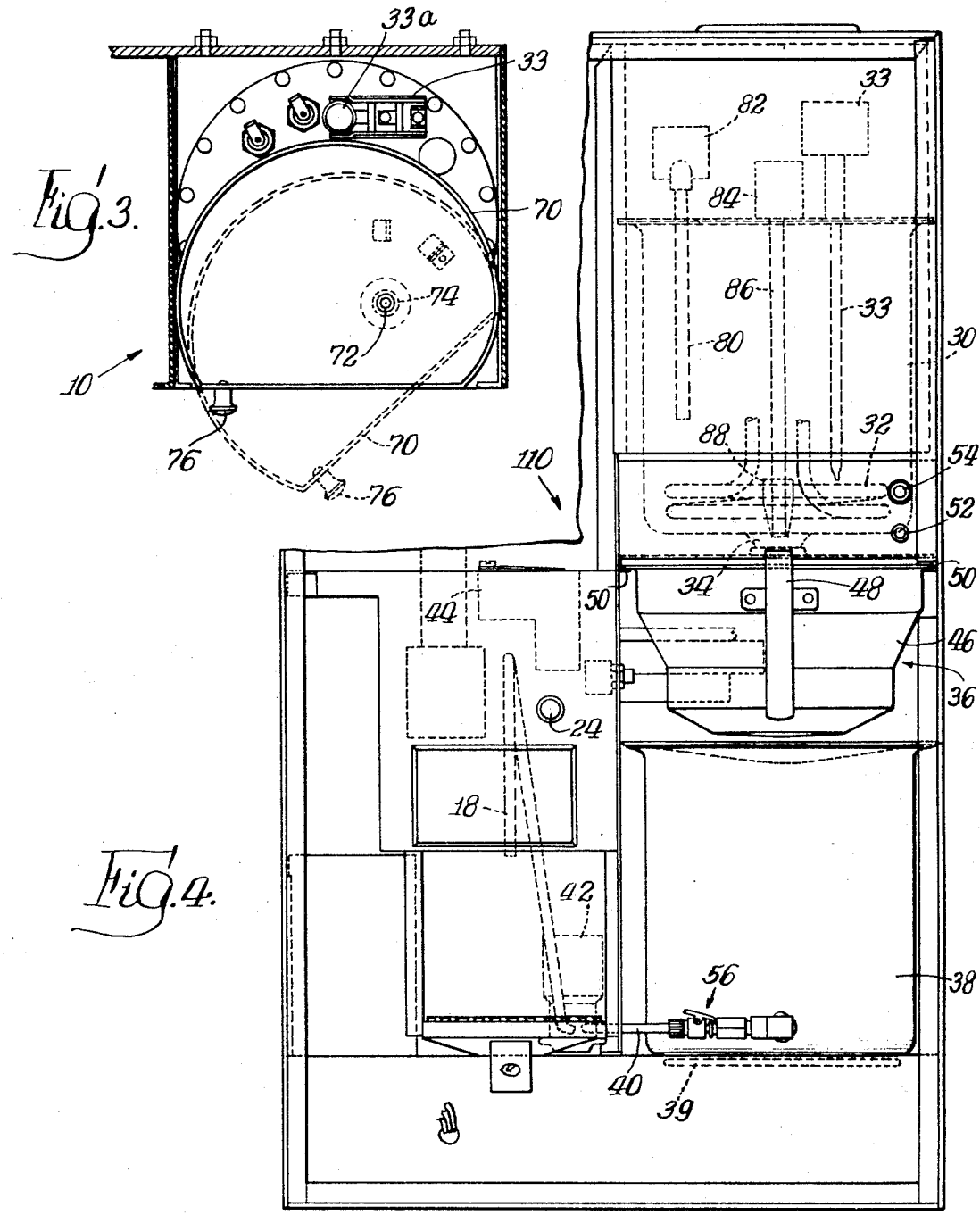

1

3,444,803
BEVERAGE BREWER AND DISPENSER
Harvey R. Karlen, Chicago, Ill., assignor to Cory Corporation, a corporation of Delaware
Filed July 7, 1967, Ser. No. 651,812
Int. Cl. A47j 31/047, 31/00, 31/057
U.S. Cl. 99—285                11 Claims

ABSTRACT OF THE DISCLOSURE

A device for manually brewing a batch of beverage, storing the batch, and dispensing the batch in separate servings by individual manual call. The berwing means includes a manually removably mounted cartridge for containing brewing ingredients which may be readily removed, cleaned, refilled and reinstalled in the device for making a subsequent batch of the beverage. The dispensing means includes a coin operated means for controlling the dispensing of the individual servings.

---

This invention relates to devices for brewing and dispensing beverages and more particularly relates to a device which is capable of brewing and storing a batch of beverage and dispensing servings from the batch on manual call as by coin control. The invention further relates to the combination of an easily and economically operable brewing apparatus in such a coin controlled device.

Coffee brewing and dispensing machines are conventionally used in public installations, private clubs, offices and the like. Generally such machines commonly employed for providing large amounts of beverage such as coffee are automatic machines which contain a plurality of canisters, each filled with the beverage charge. These machines may deliver the brewed beverage responsive to insertion of a coin. Each canister in such a machine, depending on machine design, may include enough coffee for a complete batch which is brewed and stored for call. Alternatively each canister may contain only enough coffee to brew a single cup so that the total brewing and dispensing operation is directly responsive to insertion of a coin. For smaller coffee drinker demand, non-dispensing structures, largely resembling large conventional coffee pots, have been used.

Of the above, the present automatic brewing and dispensing machines are often too expensive in structure, installation and/or operation to justify their use where there is a relatively small number of drinkers. Further, they require periodic servicing and replacement of canisters by a serviceman sent into the premises by the manufacturer or distributor of the machine. The coffee pot type of brewers have serious disadvantages, such as not providing controlled dispensing of measured amounts on call but rather permitting free pouring from a canister or the like.

The present invention comprehends a new and improved beverage brewing and dispensing apparatus which can be used conveniently for providing individual controlled servings of beverage such as coffee, and which does not present the installation servicing problems of the known devices for such brewing and dispensing of the beverage.

Another object of the invention is to provide a new and useful beverage brewer and dispenser which includes water heating, brewing, and storage apparatus in an improved combination providing facilitated replacement of the spent brewing ingredients upon completion of a brewing operation.

Still another object of the invention is to provide such

2 a device which stores a supply of the beverage for controlled dispensing of metered amounts of the beverage from the supply as by coin operation of the dispensing system.

In one aspect the present invention may include a pour-through hot water delivery system wherein a preselected quantity of cold water is poured into the device to displace substantially immediately therefrom a corresponding quantity of hot water to the brewing means, and in another aspect may include an automatic hot water delivery system connected to a source of pressurized water.

Briefly, the present invention provides a device of the type using liquid heating, beverage brewing and beverage storing apparatus arranged such that hot water is discharged from the heating means through the beverage brewing means and the brewed beverage is collected in the storage means. The heating means contains sufficient liquid to brew at least one full batch of beverage and the storage means has a capacity for containing at least one full brewed batch. The brewing means comprises a cartridge for holding a single-use charge of brewing ingredients sufficient to brew one batch of the beverage and permitting replacement thereof seriatim with other similar charges for brewing subsequent batches. The cartridge is manually releasably mounted in the brewing means and facilitated access is provided for removing and replacing the cartridge. The device also includes manually operable means for causing delivery of a batch quantity of hot water from the water heating means through the brewing cartridge to the storage means and controlled means, such as coin operated means, for dispensing a measured individual serving of the beverage from the storage means.

Other features and advantages of the invention will be apparent from the following description taken in connection with the accompanying drawing wherein:

FIG. 1 is a front elevation of an embodiment of the brewing and dispensing apparatus of this invention;

FIG. 2 is an enlarged front view thereof with the front wall removed;

FIG. 3 is a fragmentary horizontal section taken along line 3—3 of FIG. 2; and

FIG. 4 is an enlarged front view of a modified brewing and dispensing apparatus embodying the invention with the front wall thereof removed.

Referring to FIG. 1, one embodiment of brewing and dispensing apparatus generally designated 10 includes a cabinet 12 having a front door 14 hinged to the cabinet at edge 15. The door defines in its lower portion a recessed cup receiver space 16. Brewed beverage such as coffee is delivered to space 16 through a dispenser tube 18. Door 14 may also include a coin controlled mechanism 20 for controlling dispensing of beverage responsive to the depositing of a proper coin through a coin slot device 22. An indicator light 24 may be provided to indicate an empty condition of the machine. The mechanism 20 includes a coin release handle 26 for clearing the mechanism when necessary. In the event a coin is deposited when the machine is in the "empty" condition, the coin will pass through mechanism 20 through a chute 22a to a receptacle 22b for recovery by the depositor. The door may be suitably locked as by lock 14a to be opened by authorized personnel for access to the water heating and brewing apparatus of the device 10 as will be discussed in more detail below.

Referring to FIGS. 2, 3 and 4, both illustrated forms of the apparatus include a hot water supply tank 30 mounted to cabinet 12, having a low voltage heating coil 32 controlled by a temperature control 33 which extends downward into the tank for sensing the proper temperature. Control 33 includes a knob 33a for selecting a predetermined desired brewing temperature. Tank 30 has an outlet conduit at 34 for delivering hot water to and through a cartridge-type brewer indicated generally at 36 and thence to a beverage storage tank 38 for providing a batch of brewed beverage to the tank 38 to be maintained at the desired temperature by an electric heater 39. Tank 38 has a capacity greater than one batch, so that a second batch may be introduced into tank 38 before the previous batch has been completely dispensed, thereby providing a generally continuous supply of brewed beverage for dispensing. An outlet conduit 40 extends from tank 38 to dispenser tube 18. A pump 42 driven by a suitable electric motor 42a is controlled by a timer 44 for delivering a single serving of beverage when a suitable cup is delivered to space 16 to a trip switch 22.

The illustrated devices are adapted for coin operation in dispensing beverage from tank 38. Accordingly, when the proper coin is inserted in coin slot 22 to pass to coin mechanism 20, conventional controls thereof open a circuit which actuates timer 44 and pump motor 46a so that a serving of beverage is delivered from tube 18.

Brewing apparatus 36 includes a cartridge 46 having an open top for receiving the beverage charge. A paper or cloth filter may also be employed to retain the brewing ingredients, e.g., coffee grounds, as is conventional in brewing coffee. Cartridge 46 includes a handle 48 and an upper flange lip for mounting the cartridge in the brewing apparatus 36 by sliding the lip into opposing facing channels or grooves 50 which function as receivers for the lip and locate and support the cartridge 46 in its proper position in the brewing apparatus.

An indicator light 52 is controlled by control 33 for indicating when the water in tank 30 is at the proper preselected brewing temperature.

Outlet conduit 40 is provided with a quick-disconnect coupling 56 for facilitated disconnecting of the tank 38 from line 40 so that tank 38 can be readily removed for cleaning purposes and the like. A liquid level sensor system is also provided for indicating the level of brewed coffee in storage tank 38 in the form of a switch 58 carried as a fixed support 59 subjacent a movable plate 60 biased upwardly by a coil spring 61. An adjusting screw device 62 is provided for adjusting the arrangement of spring 61 whereby plate 60 is pivoted downwardly against the action of spring 61 by the weight of the tank 38 and a quantity of coffee therein greater than a preselected minimum to close said switch 58. Switch 58, as schematically shown in FIG. 2, is from one lead $L_1$ of the power supply through a warming plate heater 63 to the other supply lead $L_2$ through the "Empty" indicator light 24 to the other lead $L_2$, and through the coin acceptor mechanism 20 to lead $L_2$ for concurrent control of each of said heater 63, light 24 and switch 64 of coin acceptor 20. Illustratively, the adjusting screw device 62 may be set to effect such switching when the level of coffee in tank 38 drops to approximately two cups.

In operation for brewing a beverage, tank 30 is first filled with water to be heated by the heating coil 32. Tank 30 may be filled from a tray 70 movably carried in the cabinet 12 and having an outlet conduit 72 suitably journaled at 74 through the top wall of tank 30 so that tray 70 may be moved outwardly from the cabinet 12 by a handle 76, as best seen in FIG. 3, while pivoting on the axis of conduit 72 at journal 74 to a position extended from casing 12 a sufficient amount to permit water to be poured into tray 70 as from a decanter. After tank 33 has been filled to the level permitted by overflow outlet conduit 34 and the heater 32 has heated the water to proper brewing temperature as indicated by light 52, the device is ready for brewing operation. Cartridge 46, with the brewing ingredients placed therein, is installed in the brewing position of FIG. 2. A measured amount of water is then poured into tray 70 to flow through conduit 72 into the bottom of tank 33. Hot water is thereby displaced from tank 30 through the outlet conduit 34 and through the brewing means 36 to tank 38 thereby providing one batch of beverage in tank 38.

Device 10 as shown in FIG. 4 includes an automatic water feed system for delivering water to and from tank 30, and accordingly a push button switch 54 accessible near brewing apparatus 36 may be depressed to cause delivery of water from tank 30 through the brewing apparatus 36. A fill line 80, connected to a suitable pressurized water supply line is controlled by a solenoid valve 82 to fill tank 30 to a preselected level. A second solenoid 84 controls the discharge of a preselected quantity of water through outlet conduit 34 responsive to a depressing of switch 54. Solenoid 84 is connected to a suitable rod 86 extending downwardly through tank 30 and carrying a stopper 88 at its lower end for selectively closing outlet 34. When solenoid 84 is actuated, as shown in FIG. 4, valve 88 is removed from conduit 34 permitting flow of water through cartridge 36 for making a batch of beverage. Solenoid 84 may be controlled by a suitable conventional level control to permit delivery of hot water downwardly through outlet 34 until the level in tank 30 reaches a preselected low level whereupon solenoid 82 in the water fill line 80 is energized to initiate refilling of tank 30 and at that time solenoid 84 is deenergized to close outlet 34 and discontinue further brewing.

Thus, in each of devices 10 and 110, a preselected multi-cup batch of beverage is manually brewed by the operator and delivered to a storage tank within the device. A sufficient quantity of beverage is brewed in each manually controlled brewing operation to permit a subsequent dispensing from the storage tank of a substantial number of individual servings. Control of the individual servings is effected by means of a coin mechanism which may be arranged to accept conventional coins or tokens which, for example, may be issued by the proprietor of the place in which the device is installed. When the device is installed in an office, the brewing of the batches of coffee may be effected by conventional office personnel, without the need for protective clothing such as aprons, as such brewing entails merely the provision of a suitable charge of coffee in the cartridge as from a bagged supply thereof and the placement of the filled cartridge into the brewing apparatus. Brewing of the coffee is effected by the pouring of a quantity of cold water into the tray 70 of the device 10, or by operation of the push button controlled hot water supply of device 110 whereby a preselected quantity of hot water is passed through the cartridge 46 to form the brew and deliver it into the subjacent tank. Such preparation of the coffee batch may be effected at any time by the user as the cartridge is accessible at all times for replacement of the spent charge with a fresh charge and the hot water supply tank maintains the water therein available at all times for substantially immediate brewing of a batch of coffee when desired. However, dispensing of the individual cups may be controlled as by use of a coin operated mechanism so that while anyone may prepare batches of the coffee, dispensing of the brewed coffee may be selectively controlled.

Thus the present invention provides the highly desirable feature of permitting unrestricted brewing of desired batches of coffee while permitting only restricted dispensing of the brewed batches. As only a single brewing cartridge need be employed, the device may be compact for facilitated installation in locations such as offices while yet freshly brewed coffee may continuously be made available as necessary. To facilitate such maintained availability, the devices may be provided with indicting lmps for indicating the depletion of the batch from the tank to a preselected minimum level. By use of the pour-through hot water device 10, it is unnecessary to provide pressurized water supply lines to the apparatus, thus further simplifying installation in locations such as offices.

I claim:

1. Apparatus for providing brewed beverage, comprising: means for heating a beverage brewing liquid to a preselected brewing temperature; means for storing brewed beverage; brewing means; means for directing hot water from said liquid heating means to said brewing means and delivering liquid beverage from said brewing means to said storing means, said brewing means comprising means for replaceably holding a charge of brewing ingredients sufficient to brew one batch of beverage and requiring replacement of a spent charge with a fresh charge for brewing a subsequent batch of beverage; means for manually releasably mounting said brewing means in operative association with said hot water directing means and said storing means; means permitting only controlled access to said brewing means for selective manual removing and remounting of said brewing means by only an authorized person; manually controlled delivery means operable only by the authorized person for causing said heating means to deliver a preselected quantity of liquid at said brewing temperature through said brewing means for brewing a corresponding quantity of beverage and directing said quantity to the storing means; and controlled manually operable dispenser means for measuring and dispensing seriatim individual servings of beverage from said storing means.

2. The device of claim 1 wherein said selectively operable delivery means comprises a push button adjacent said brewing means and means responsive to manipulation of said push button for causing delivery of said liquid.

3. The device of claim 1 wherein said heating means comprises a storage tank and said selectively operable delivery means comprises a receiver for receiving the preselected quantity of liquid by manual pouring thereinto and having an outlet for directing liquid into said tank for displacing a corresponding quantity of hot liquid therefrom.

4. The device of claim 3 wherein the components of said apparatus are mounted in a cabinet and are provided for mounting said receiver for movement between a storage position within said cabinet and a fill position at least partially outwardly thereof.

5. The device of claim 1 wherein said manually operable dispenser means comprises a coin receiving means responsive to reception of a predetermined coin for controlling metering and discharging of an individual serving.

6. The apparatus of claim 5 wherein the components of said apparatus are mounted in a cabinet including an unobstructed cup receiving space in the front wall thereof.

7. The device of claim 1 including means responsive to the level of said batch for indicating to the user when the batch in said storing means is below a predetermined level.

8. The apparatus of claim 1 further including means for indicating when the liquid in said heating means is at said preselected temperature.

9. The apparatus of claim 1 further including means for preventing operation of said dispenser means when the quantity of beverage in said storing means is below a preselected quantity.

10. The apparatus of claim 1 wherein said storing means has a capacity greater than said batch whereby a second batch of beverage may be brewed and delivered thereinto before the previous batch is completely dispensed therefrom.

11. The apparatus of claim 1 wherein said controlled access means includes lock means.

References Cited

UNITED STATES PATENTS

| | | | |
|---|---|---|---|
| 2,813,965 | 11/1957 | Arnett | 99—282 |
| 3,326,115 | 6/1967 | Karlen | 99—283 |
| 3,366,034 | 1/1968 | Karlen | 99—282 |

ROBERT W. JENKINS, *Primary Examiner*.